US012807815B2

(12) United States Patent
Butz et al.

(10) Patent No.: US 12,807,815 B2
(45) Date of Patent: Nov. 24, 2026

(54) BITUMEN ADDITIVE COMPRISING AN AQUEOUS WAX DISPERSION AND ITS USE TO OBTAIN A FOAMED BITUMEN

(71) Applicant: Sasol Germany GmbH, Hamburg (DE)

(72) Inventors: Thorsten Butz, Buchholz (DE); Susann Gross-Matthai, Hamburg (DE); Carsten Oelkers, Seevetal (DE); Ben Jones, Hamburg (DE)

( * ) Notice: Subject to any disclaimer, the term of this patent is extended or adjusted under 35 U.S.C. 154(b) by 703 days.

(21) Appl. No.: 18/247,876

(22) PCT Filed: Nov. 2, 2021

(86) PCT No.: PCT/EP2021/080417
§ 371 (c)(1),
(2) Date: Apr. 4, 2023

(87) PCT Pub. No.: WO2022/090577
PCT Pub. Date: May 5, 2022

(65) Prior Publication Data

US 2023/0374311 A1 Nov. 23, 2023

(30) Foreign Application Priority Data

Nov. 2, 2020 (EP) .................................... 20205287

(51) Int. Cl.
*C08L 95/00* (2006.01)
*C08J 3/22* (2006.01)
(Continued)

(52) U.S. Cl.
CPC ................. *C08L 95/00* (2013.01); *C08J 3/22* (2013.01); *C08J 9/0061* (2013.01); *C08J 9/283* (2013.01);
(Continued)

(58) Field of Classification Search
CPC ...... C08L 95/00; C08L 91/06; C08L 2201/52; C08L 2203/14; C08L 2207/22;
(Continued)

(56) References Cited

FOREIGN PATENT DOCUMENTS

| | | | |
|---|---|---|---|
| CN | 1396213 A | * | 2/2003 |
| CN | 1793234 A | * | 6/2006 |

(Continued)

OTHER PUBLICATIONS

Machine English translation of Qin, Lan-cheng, CN-1396213-A, Feb. 12, 2003. (Year: 2003).*

(Continued)

*Primary Examiner* — Coris Fung
*Assistant Examiner* — Caroline D. Liott
(74) *Attorney, Agent, or Firm* — Werner IP Law, P.C.

(57) ABSTRACT

The invention relates to a bitumen additive comprising a wax dispersed in water, the water being in the continuous phase and the wax in the dispersed phase; the wax comprising a Fischer-Tropsch wax and one or more hydrocarbon waxes selected from the group comprising petroleum-based waxes, polyolefin waxes, or mixtures thereof; and an emulsifier. The invention extends to a method to produce a foamed bitumen composition by adding a bitumen additive to a bitumen feedstock in a bitumen foaming device to produce the foamed bitumen, and to a method to produce an asphalt mix by adding a bitumen feedstock and a bitumen additive to an aggregate in an asphalt mixer to produce the asphalt mix.

12 Claims, 1 Drawing Sheet

(51) Int. Cl.

| | |
|---|---|
| ***C08J 9/00*** | (2006.01) |
| ***C08J 9/28*** | (2006.01) |
| ***C08L 91/06*** | (2006.01) |

(52) U.S. Cl.
CPC ....... *C08L 91/06* (2013.01); *C08J 2201/0504* (2013.01); *C08J 2395/00* (2013.01); *C08J 2491/06* (2013.01); *C08L 2201/52* (2013.01); *C08L 2203/14* (2013.01); *C08L 2207/22* (2013.01); *C08L 2310/00* (2013.01); *C08L 2555/26* (2013.01); *C08L 2555/50* (2013.01); *C08L 2555/60* (2013.01)

(58) Field of Classification Search
CPC ............. C08L 2310/00; C08L 2555/26; C08L 2555/50; C08L 2555/60; C08L 2555/40; C08L 91/08; C08L 2555/52; C08J 3/22; C08J 9/0061; C08J 9/283; C08J 2201/0504; C08J 2395/00; C08J 2491/06; Y02A 30/30
See application file for complete search history.

(56) References Cited

FOREIGN PATENT DOCUMENTS

| | | | | | | |
|---|---|---|---|---|---|---|
| CN | 100410328 | C | * | 8/2008 | | |
| CN | 101475748 | A | * | 7/2009 | | |
| CN | 109526224 | | | 3/2019 | | |
| DE | 102006002085 | | | 7/2007 | | |
| EP | 3249017 | A1 | * | 11/2017 | ............. | E01C 19/48 |

OTHER PUBLICATIONS

Machine English translation of Wu, Kuang-huai, CN-1793234-A, Jun. 28, 2006. (Year: 2006).*
Machine English translation of Sun, Li-jun, CN-100410328-C, Aug. 13, 2008. (Year: 2008).*
Machine English translation of Qin, Lan-cheng, CN-101475748-A, Jul. 8, 2009. (Year: 2009).*
Sasol, "Sasobit Redux, Product Information," Jun. 2016, pp. 1-8. (Year: 2016).*
Sasol, "Sasobit Redux, Working principle of Sasobit Redux in comparison to Sasobit," Aug. 2016, pp. 1-2. (Year: 2016).*

* cited by examiner

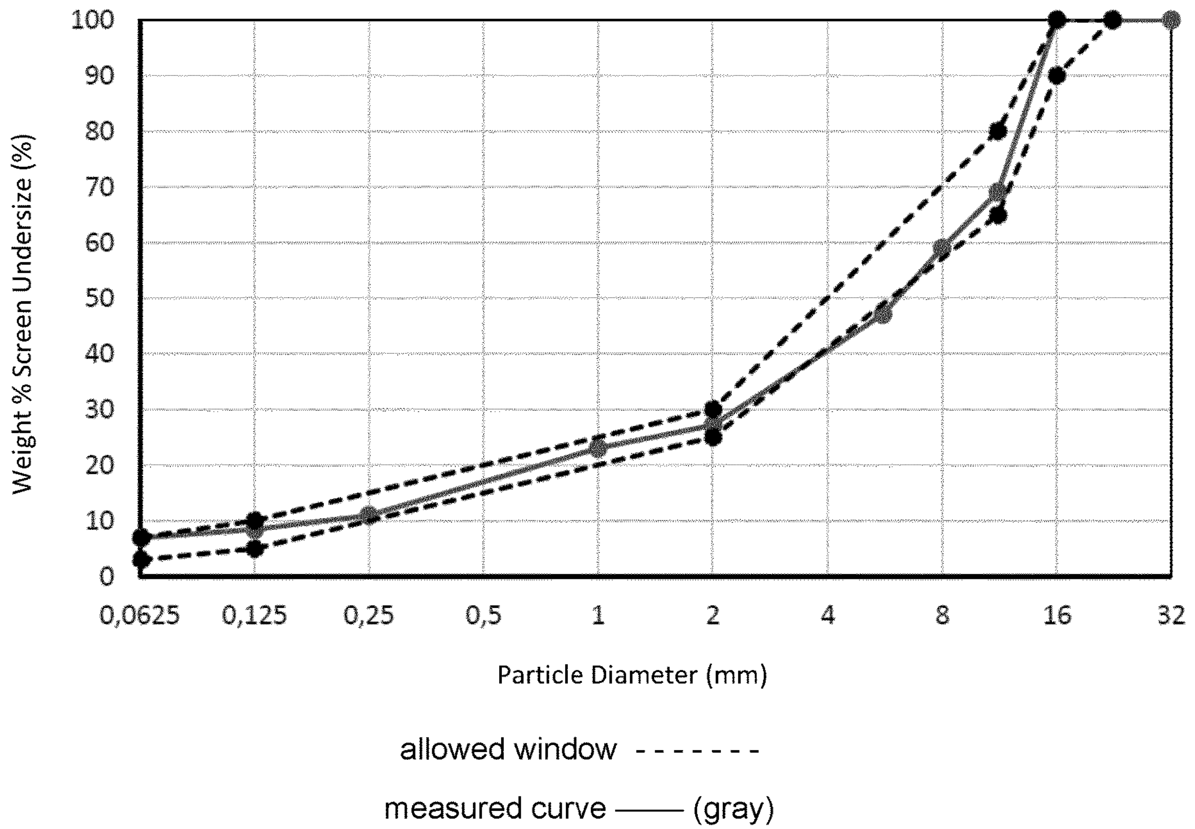
Weight % Screen Undersize (%)
100
90
80
70
60
50
40
30
20
10
0
0,0625
0,125
0,25
0,5
1
2
4
8
16
32
Particle Diameter (mm)
allowed window - - - - - - -
measured curve —— (gray)

BITUMEN ADDITIVE COMPRISING AN AQUEOUS WAX DISPERSION AND ITS USE TO OBTAIN A FOAMED BITUMEN

FIELD OF THE INVENTION

This invention relates to a bitumen additive, a bitumen composition, a method to produce a foamed bitumen, a method to produce an asphalt mix, and the use of the bitumen additive in said methods.

BACKGROUND OF THE INVENTION

Bitumen is a naturally occurring mixture of organic compounds with viscoelastic properties. Bitumen is typically obtained from the vacuum distillation of crude oil. It is a sticky, non-volatile substance which is largely soluble in non-polar solvents.

Bitumen is widely used in construction applications, for example in roof coatings, bitumen blanks, etc., but one of the most important applications for bitumen is its use as a binder for stone aggregates in asphalt for road paving.

To improve the performance of bitumen-based asphalt products, different additives or modifiers are often used, such as fillers (e.g. hydrated lime, cement, carbon black), extenders (e.g. sulphur, lignin), rubber, elastomeric polymers, plastomeric polymers, resins, fibres (e.g. rock wool, cellulose), anti-oxidants, hydrocarbons, rejuvenators, antistripping agents, organosilanes, surfactants and waste materials (e.g. reclaimed asphalt pavement (RAP)).

Waxes are known as suitable additives for bitumen, since they generally help to improve the durability of asphalt mixes and of road paving. Hydrocarbon waxes such as paraffin waxes, Fischer-Tropsch waxes, and wax mixtures have been used to modify various properties such as the viscosity of bitumen at different temperatures.

Waxes are generally defined as chemical compositions, which have a drop melting point above 40° C., are polishable under slight pressure, are kneadable or hard to brittle and transparent to opaque at 20° C., melt above 40° C. without decomposition, and typically melt between 50° C. and 90° C. and in exceptional cases up to 200° C., form pastes or gels and are poor conductors of heat and electricity.

Waxes can be classified according to various criteria, for example according to their origin. According to origin, waxes can be divided into two main groups: natural waxes and synthetic waxes. Natural waxes can further be classified into fossil waxes (e.g. petroleum waxes) and non-fossil waxes (e.g. animal and vegetable waxes). Petroleum waxes can be classified into macrocrystalline waxes (paraffin waxes) and microcrystalline waxes (microwaxes). Synthetic waxes can be classified into partially synthetic waxes (e.g. amide waxes) and fully synthetic waxes (e.g. polyolefin waxes or Fischer-Tropsch waxes).

Paraffin waxes can for example originate from the vacuum distillation of crude oil. Paraffin waxes are clear, odour-free and can be refined for food contact. They primarily contain a range of n-alkanes, but also contain iso-alkanes and some cyclo-alkanes. Raw or crude petroleum based waxes (petroleum slack waxes) have a large content of short-chain and highly branched alkanes ("oils"), which can be removed when said waxes are de-oiled. Different distributions and qualities of paraffin waxes can be obtained via de-oiling. A petroleum slack wax is a paraffin wax with an oil content in the range from 5% to 30%. Petroleum Slack waxes may be further refined, e.g. by distillation, bleaching and hydrotreating to become a refined petroleum based wax.

Microwaxes can for example originate from de-asphalting, de-aromatization, and de-oiling of petroleum vacuum distillation residues. They are rich in branched and cyclic alkanes and contain generally less than 50% n-alkanes.

Synthetic Fischer-Tropsch waxes originate from the catalysed Fischer-Tropsch synthesis of syngas (CO and $H_2$) to alkanes. This synthesis route leads to a mixture of hydrocarbons comprising linear hydrocarbons and linear hydrocarbons with methyl-branching, and preferably no cyclic hydrocarbons. There are differences between petroleum-based paraffin waxes and Fischer-Tropsch waxes which result in them having different properties, e.g. with respect to crystallization properties and rheological behaviour. Another source of synthetic waxes are polyolefin waxes, which are hydrocarbons obtained from the oligomerization or polymerization of olefinic monomers, possibly followed by hydrotreating.

Asphalt mixes and road paving are strictly controlled according to national and international regulations and standards in order to ensure their quality and integrity. Apart from aiming to enhance the performance of asphalt mixes as the final product, one key driver of many regulations and standards is the reduction of the bitumen temperature during road paving operations. A lower temperature reduces energy input into road paving operations thus reducing the associated carbon footprint. Even a reduction on the process temperature to 120° C. would result into a saving of 25% of the expended energy. For a typical hot mix production plant, running at about 100 ton/h, this savings would translate into a conservation of about 130 $m^3$ of natural gas (or about 130 kg of fuel) per hour.

(L. Grampre, J. A. Gonzales Leon, G. Barreto: Warm asphalt mixtures by chemical additivation: field tests and laboratory studies. 4. Congress Eurasphalt & Eurobitume, 21. -23. Mai 2008, Kopenhagen).

A reduction in temperature also reduces bitumen fumes and other gaseous emissions which protects the health of construction crews, as shown below:

Emission measurements of hot asphalt and warm asphalt mixtures:

Hot Asphalt Mixture (Mixing temperature: 160-175° C.)
Warm Asphalt Mixture (Mixing temperature: 110-120° C.
CO2 (mg/$m^3$)–25%
CO (mg/$m^3$)–30%
NOx (mg/$m^3$ eq NO2)–25%
Dust (mg/$m^3$)–88%
(from Gampre et al. supra)

As a result, there is a growing global trend towards warm mix asphalt (WMA) processes which operate at lower temperature.

A bitumen additive which permits a lower bitumen temperature to be used during road making operations would accordingly be desirable.

One well-known and very effective means for reducing bitumen temperature is through foaming. It has disadvantages, though, as when bitumen is foamed, asphalt quality is typically reduced.

Foamed bitumen is conventionally produced by adding small amounts of water (e.g. approximately 2-5 wt %) to hot bitumen. When injected into the hot bitumen the water evaporates abruptly, causing foaming of the bitumen in a saturated steam atmosphere. The bitumen can expand by 20 to 30 times its original volume.

The intensity and effectiveness of the bitumen foaming process can be improved by controlling basic physical conditions in the foaming apparatus, such as the pressure and temperature. In asphalt mix production plants or in laboratory plants, bitumen foaming takes place in an expansion chamber where water is injected into the hot bitumen, which has a temperature of approximately 180° C. and a pressure of around 5 bar gauge (g). The foamed bitumen thus produced escapes the expansion chamber through a nozzle and can immediately by mixed with aggregates, which is then treated/coated with bitumen to form an asphalt for road paving.

Foaming of bitumen changes its key physical parameters as it allows for a larger surface area of the bitumen, leading to an improved bitumen coating of aggregates. Foamed bitumen is also less viscous and disperses more readily in aggregates. Importantly, a foamed bitumen can be handled at temperatures well below 100° C.

WO2000068302A1 relates to a method of producing a bituminous foam, the method comprising raising the temperature of an emulsion which includes bitumen and a liquid which is substantially insoluble in said bitumen. To produce the foamed bitumen, the emulsion is discharged from a high-pressure environment to a low-pressure environment, whereby said emulsion foams after discharge into the low-pressure environment.

CN104861674A relates to a water-in-oil type asphalt foaming agent comprising an oil phase containing residual oil, asphalt or fraction oil, and a water phase containing surfactant dispersed in continuous phase of oil.

DE3834950C1 relates to the production of a bituminous blend by adding finely divided polymer bitumen binder in a gaseous or liquid carrier to hot bitumen and introducing the blend into a mixing machine containing granular additive. An emulsion, suspension or dispersion of the polymer is preferably formed with the liquid carrier and this mixture is then added to a hot bitumen stream before the blend is introduced into the mixing machine.

PL398906A relates to a process for the manufacture of asphalt concrete using reduced temperature technology wherein foamed asphalt is added to the mineral mix, characterized in that synthetic F-T wax is added to liquid asphalt, preferably in an amount of from 2.0 to 3.5%, and foamed after mixing; subsequently, it is combined with the mineral mix heated to no more than 100° C.

A foamed bitumen that maintains an asphalt quality suitable for paving, e.g. road paving, would be advantageous.

DESCRIPTION OF THE INVENTION

Bitumen Additive

According to the invention, there is provided a bitumen additive comprising:

- a wax dispersed in water, the water being in the continuous phase and the wax being, at room temperature, in the dispersed phase;
- the wax comprising a Fischer-Tropsch wax and one or more hydrocarbon waxes, selected from the group comprising petroleum-based waxes, polyolefin waxes, or mixtures thereof; and
- an emulsifier.

The petroleum-based wax may be a petroleum slack wax, a refined petroleum wax, an unrefined petroleum wax, or mixtures thereof. Preferably, the petroleum-based wax is a petroleum slack wax.

Optionally, the bitumen additive may additionally comprise alpha olefins, fatty acids, fatty alcohols, esters of fatty acids, amide waxes, or any mixture thereof.

The bitumen additive may comprise an elastomer.

The bitumen additive may comprise from about 5 wt % to about 95 wt % of the wax, preferably from about 30 wt % to about 70 wt % of the wax, based on the total mass of the bitumen additive.

The bitumen additive may comprise from about 0.2 wt % to about 10 wt % of the emulsifier, preferably from about 1 wt % to about 6 wt % of the emulsifier, based on the total mass of the bitumen additive.

The bitumen additive may comprise from about 1 wt % to about 70 wt % of the elastomer, preferably from about 20 wt % to about 50 wt % of the elastomer, based on the total mass of the bitumen additive.

Preferably, the wax is a mixture of a Fischer-Tropsch wax and a petroleum slack wax.

Where the wax is a mixture of a Fischer-Tropsch wax and a petroleum slack wax, the wax comprises or consists of:

- 20 wt % to 80 wt % of the petroleum slack wax; and
- 20 wt % to 80 wt % of the Fischer-Tropsch wax,
- each relative to a total mass of the mixture of the Fischer-Tropsch wax and the petroleum slack wax.

The Fischer-Tropsch wax may have the following properties:

- a congealing point according to ASTM D938 of 50° C. or higher, preferably 60° C. or higher, more preferably between 70° C. and 110° C., most preferably between 75° C. and 82° C.;
- a MEK-oil content according to ASTM D7211-06 below 5 wt %, preferably below 2 wt %;
- a kinematic viscosity at 100° C. according to ASTM D7042-11 from 3 $mm^2/s$ to $mm^2s$, preferably 5 $mm^2/s$ to 10 $mm^2/s$, more preferably from 7 $mm^2/s$ to 9 $mm^2/s$;
- a needle penetration at 25° C. according to ASTM D1321 below 30 1/10 mm, preferably below 10 1/10 mm; and
- a n-alkane content above 80 wt %.

The petroleum slack wax may have the following properties:

- a congealing point according to ASTM D938 below 65° C.;
- a MEK-oil content according to ASTM D7211-06 above 5 wt %, preferably above 15 wt %;
- a kinematic viscosity at 100° C. according to ASTM D7042-11 from 3.5 $mm^2/s$ to 10 $mm^2/s$, preferably from 5 $mm^2/s$ to 10 $mm^2/s$, more preferably from 6 $mm^2/s$ to 8 $mm^2/s$;
- a needle penetration at 25° C. according to ASTM D1321 above 50 1/10 mm; and
- a n-alkane content below 70 wt %, preferably below 40 wt %.

The emulsifier may be an anionic emulsifier, a cationic emulsifier, a non-ionic emulsifier, or any mixture thereof. Preferred is a cationic emulsifier. Preferably, the emulsifier is an amine-based cationic emulsifier.

The elastomer may be a styrene-butadiene rubber (SBR) polymer, a butadiene-acrylonitrile polymer, an isoprene polymer, a chloroprene polymer, a styrene-isoprene polymer, a styrene-ethylene/butylene polymer, a styrene-butadiene-styrene (SBS) polymer, a latex dispersion, or any mixture thereof.

The styrene-butadiene rubber (SBR) polymer may be provided in the form of a styrene-butadiene rubber (SBR) polymer dispersion in water (water is the continuous phase). The styrene-butadiene styrene (SBS) polymer may be provided in the form of a styrene-butadiene styrene (SBS) polymer dispersion in water (water is the continuous phase).

Method to Produce a Foamed Bitumen Composition

According to another aspect of the invention, there is provided a method to produce a foamed bitumen composition, the method comprising: adding the bitumen additive as hereinbefore defined to a bitumen feedstock in a bitumen foaming device thereby to produce the foamed bitumen.

When it is referred to "hereinbefore" or "hereinbefore defined" herein, this means including the preferred embodiments mentioned before.

The method may be carried out in batch mode or in continuous mode.

The foamed bitumen may be discharged from the bitumen foaming device via a lance or a nozzle. The foamed bitumen may be used to coat or treat an aggregate or an aggregate mix, thereby to produce an asphalt or an asphalt mix for paving, e.g. road paving.

The bitumen in the bitumen foaming device may be at a temperature in the range of from about 100° C. to about 200° C., preferably at a temperature in the range of from about 120° C. to about 180° C.

The bitumen foaming device may be operated at a pressure in the range of from about 2 bar gauge (g) to about 10 bar(g), preferably at a pressure in the range of from about 4 bar(g) to about 8 bar(g).

The bitumen additive may be added to the bitumen feedstock in an amount of from about 0.1 wt % to about 10 wt %, preferably from about 2 wt % to about 6 wt %, based on the total mass of the bitumen feedstock.

The foamed bitumen may have a volume of from about 1.5 times to about 50 times, preferably from about 2 times to about 30 times, relative to a starting volume of the bitumen feedstock. In other words, the volume expansion of foamed bitumen relative to bitumen feedstock may be from about 1.5 time to about 50 times, preferably from about 2 times to about 30 times.

The foamed bitumen may have a foam half-life of from about 4 s to about 60 s, preferably from about 15 s to about 40 s. Advantageously, the foamed bitumen produced according to the method of the invention has a foam half-life that is similar to a typical asphalt mix batch cycle time.

Method to Produce an Asphalt Mix

In this specification, "asphalt" or "asphalt mix" is understood to mean a mixture of a mineral aggregate and a bituminous binder.

According to another aspect of the invention, there is provided a method to produce an asphalt mix, the method comprising:

adding a bitumen feedstock and the bitumen additive as hereinbefore defined to an aggregate in an asphalt mixer thereby to produce the asphalt mix.

The aggregate may comprise or may consist of recycled or reclaimed asphalt pavement (RAP).

The method may be carried out in batch mode or in continuous mode.

The asphalt mixer may be a pug mill.

The bitumen feedstock may be added to the aggregate prior to adding the bitumen additive to the aggregate.

The bitumen feedstock may be added to the aggregate after adding the bitumen additive to the aggregate.

The bitumen feedstock may be added to the aggregate concurrently with adding the bitumen additive to the aggregate.

The bitumen feedstock may be foamed in the asphalt mixer when the bitumen feedstock is contacted with the bitumen additive.

In an alternative embodiment, the bitumen additive may be added to the bitumen feedstock in a bitumen foaming device thereby to produce a foamed bitumen composition, and the foamed bitumen composition may then be added to the aggregate in the asphalt mixer.

The foamed bitumen may be produced according to the method hereinbefore described.

The asphalt mix may be a warm mix asphalt.

The asphalt mix may be discharged from the asphalt mixer to a truck or to a silo. The asphalt mix may be used for paving, e.g. road- or other paving.

Typically, the asphalt mix is loaded in a truck and transported to a building site where the asphalt mix is applied to a surface with a paver to obtain an asphalt surface, which is then compacted with a roller.

The asphalt mixer may be operated at a temperature in the range of from about 90° C. to about 230° C., preferably at a temperature in the range of from about 110° C. to about 180° C.

The bitumen additive may be added to the aggregate in an amount of from about 0.1 wt % to about 10 wt %, preferably from about 2 wt % to about 6 wt %, based on the total mass of the bitumen feedstock that is added to the aggregate.

Advantageously, the methods of the invention make use of existing bitumen foaming devices and/or existing asphalt mixers in asphalt mixing plants and the bitumen additive can be added directly into the asphalt mixer using existing liquid additive dosing systems. Thus, the methods of the invention can be implemented with minimal, if any, equipment changes and at low cost to the user.

The methods of the invention conveniently enable elastomers to be added to the bitumen with the wax via the bitumen additive for in situ co-modification (i.e. concurrent wax- and elastomer modification) of asphalt mixes. Elastomer modification allows the low temperature flexibility of asphalt to be improved, resulting in higher cracking resistance and better fatigue behaviour. Wax modification enables lower viscosity of asphalt and hence better workability, as well as enables lower temperature asphalt mixing operations. Furthermore, the wax added as bitumen additive imparts warm mix capabilities after the bitumen foam has collapsed.

The methods of the invention have the advantage that they combine the beneficial effects of bitumen foaming without compromising asphalt quality. Where foaming is not used, the invention provides a simple and effective means for lowering asphalt mixing temperatures.

Bitumen Composition

According to another aspect of the invention, there is provided a bitumen composition, the bitumen composition comprising:

a bitumen; and the bitumen additive as hereinbefore defined.

The bitumen composition may be produced according to the method hereinbefore described.

The bitumen composition may be a foamed bitumen composition.

Asphalt Mix

According to another aspect of the invention there is provided an asphalt mix, the asphalt mix comprising:

a bitumen;

the bitumen additive as hereinbefore defined; and an aggregate.

The asphalt mix may be produced according to the method hereinbefore described.

The aggregate may comprise or may consist of recycled or reclaimed asphalt pavement (RAP).

Preferably, the asphalt mix is a warm mix asphalt.

Use of the Bitumen Composition

According to another aspect of the invention, there is provided the use of a bitumen composition or a foamed bitumen composition to produce an asphalt mix.

The bitumen composition or the foamed bitumen composition may be produced according to the method hereinbefore described.

The asphalt mix may be produced according to the method hereinbefore described. Preferably, the asphalt mix is a warm mix asphalt as hereinbefore described.

Use of the Bitumen Additive

According to another aspect of the invention, there is provided the use of the bitumen additive as hereinbefore defined for producing a bitumen composition.

The bitumen composition may be a foamed bitumen composition. The foamed bitumen composition may be as hereinbefore described.

Use of the Asphalt Mix

According to another aspect of the invention, there is provided the use of an asphalt mix for paving.

The asphalt mix may be produced according to the method hereinbefore described. Preferably, the asphalt mix is a warm mix asphalt as hereinbefore described.

Experimental Results

Preparation of Bitumen Additives

Base Bitumen Additives

Base bitumen additives according to the present invention were prepared by adding a wax comprising 60 wt % Fischer-Tropsch wax and 40 wt % petroleum slack wax available under the trade name SASOBIT REDUX, and an emulsifier to water and homogenizing all the components in an APV-type laboratory high pressure homogenizer operated at 100° C. and 220 bar(g). The components of the base bitumen additives (wax, emulsifier, and water) were cycled for between 195 seconds and 240 seconds, before being discharged and cooled down to 25° C. using a plate heat exchanger.

Base bitumen additives using either anionic emulsifiers (anionic bitumen additives) or cationic emulsifiers (cationic bitumen additives) were produced as follows:

| | |
|---|---|
| Anionic Bitumen Additive | 50 wt % water |
| | 45.68 wt % wax |
| | 0.11 wt % $Na_2SO_4$ |
| | 2.2 wt % $C_{18}$-$C_{22}$ fatty acid |
| | 1.01 wt % diethanolamine |
| | 1.0 wt % fatty alcohol ethoxylate (9 EO) available in the trade name EMULAN AT 9 |
| | Viscosity: 44 mPa s at 23° C. |
| Cationic Bitumen Additive | 50 wt % water |
| | 47.66 wt % wax |
| | 1.4 wt % N-$C_{16}$-$C_{22}$-alkyltrimethylenediamine available under the name trade DINORAM 42 E |
| | 0.7% acetic acid (60%) |
| | 0.24% dicyclohexylamine |
| | Viscosity: 50 mPa s at 23° C. |

The storage stability of the base bitumen additives was evaluated. Both the anionic- and cationic bitumen additives were found to be storage stable at room temperature for more than 4 weeks.

Elastomer/Bitumen Additives

Three bitumen additives comprising elastomer (elastomer/wax dispersions) were prepared by mixing the anionic bitumen additive with high solid content styrene-butadiene-rubber (SBR) latex dispersions for asphalt applications available under the trade names BUTONAL NS 177, BUTONAL NX 1129 and BUTONAL 5126 X. One-to-one (1:1) mass ratios of the SBR latex dispersions and the anionic bitumen additive were compatible, and found to be storage stable at room temperature for more than one week.

Bitumen Foaming Investigations

Both the anionic and cationic base bitumen additives were used for bitumen foaming investigations and asphalt production investigations. For the bitumen foaming investigations, the anionic- and cationic base bitumen additives were diluted to 33.33 wt % wax content using water.

Foamed bitumen was prepared using a WIRTGEN WLB 10 S laboratory foamed bitumen plant. Bitumen available under the trade name AQUALT 70/100 was used for the bitumen foaming studies as it is a desalted bitumen and accordingly known in the industry as suitable for foaming applications.

The diluted base bitumen additives were fed into the bitumen foaming plant at a concentration of 5 wt % relative to the mass of bitumen. The bitumen additive was added at room temperature. The temperature of the bitumen during the foaming process was 170° C.

A reference water-foamed bitumen experiment was conducted and compared to bitumen foamed with the anionic bitumen additive and cationic bitumen additive of the invention. Expansion and foam half-life were determined according to the standardized procedure “Merkblatt für Kaltrecycling in situ im Straßenoberbau, 2005” of the German Road and Transportation Research Association (Forschungsgesellschaft für Straßen- and Verkehrswesen (FGSV)).

Foam expansion of bitumen foamed with the anionic- and cationic bitumen additives was found to be in the range of from 3 to 6 times, compared to 32 times for water-foamed bitumen.

Foam stability, expressed as foam half-life in seconds, increased from 6 seconds for water-foamed bitumen, to 15 seconds for bitumen foamed with the anionic bitumen additive, and to 39 seconds for bitumen foamed with the cationic bitumen additive.

The inventors believe that an extension of the bitumen foam half-life imparted by the bitumen additive of the invention is practically more important in the production of asphalt mixes than the reduced foam expansion, since the lubricity and workability of the bitumen are enhanced.

In particular, longer bitumen foam half-life improves the lubricity and workability of bitumen for an extended duration, which equals or even exceeds the typical batch mixing duration (20-30 seconds) (Asphalt Leitfaden “Splittmastixasphalt”, Deutscher Asphaltverband e.V., 2000) in a batch asphalt mixing plant during mixing of the foamed bitumen with aggregate, which is not the case with water-foamed bitumen that had only second half-life.

Preparation of Asphalt Mixes

The bitumen used to prepare the reference hot mix asphalt was a pavement grade bitumen available under the trade name AZALT 70/100, a standard and widely used bitumen. All other asphalt mixes were prepared with AQUALT 70/100 as previously described. AZALT 70/100 and AQUALT 70/100 are from the same producer, for obtaining a comparable reference.

Several asphalt mixes A to F were prepared in a temperature controlled, heated GZM-30 laboratory asphalt mixer (manufacturer Baustoff-Prüfsysteme Wennigsen GmbH), applying the German regulations TL Asphalt-StB 07/13 for asphalt binder course mix AC 16 B S. The bitumen content was 4.5 wt % and the aggregate content was 95.5 wt %. The aggregate type was basalt, and the filler was limestone (calcium carbonate).

FIG. 1 shows the aggregate grading curve of the asphalt binder course mix AC16 B S according to TL Asphalt-StB 07/13 with the particle diameter shown on the X-axis and the weight percentage screen undersize shown on the Y-axis.

A reference hot mix asphalt was mixed with bitumen available under the trade name AZALT 70/100 (A) and compacted at 150° C., the reference asphalt prepared with water-foamed bitumen (B) was mixed at 120° C. and the asphalt mixes with various bitumen additives (B, C) were also mixed at 120° C.

In accordance one embodiment of the method of the invention, the bitumen additive is added directly to the asphalt mixer. First, bitumen was added to hot aggregates in the mixer. Directly afterwards, the bitumen additive was added. at 120° C. (E).

Additionally, for comparative purposes, a wax available under the trade name SASOBIT REDUX was blended with the bitumen and then the mixture of wax and bitumen was added to the asphalt mixer at 120° C. (F). Table 1 shows the various asphalt mixes A to F produced and the corresponding mixing temperatures.

TABLE 1a

| Asphalt mixes | | | |
|---|---|---|---|
| Mix No. | Mix type | Bitumen type | Mixing temperature [° C.] |
| A | Hot Mix | AZALT 70/100 without additive | 150 |
| E | Warm Mix | AQUALT 70/100; cationic bitumen additive directly added into the asphalt mixer | 120 |
| F | Warm Mix | AQUALT 70/100; wax directly added into the asphalt mixer pre-blended with the bitumen | 120 |

TABLE 1b

| Foamed asphalt mixes | | | |
|---|---|---|---|
| B | Warm Mix | AQUALT 70/100 foamed with water | 120 |
| C | Warm Mix | AQUALT 70/100 foamed with the anionic bitumen additive | 120 |
| D | Warm Mix | AQUALT 70/100 foamed with the cationic bitumen additive | 120 |

It is immediately apparent that the unfoamed asphalt mixes E and F were mixed at a temperature which was thirty degrees Celsius lower than the non-additized asphalt mix A.

Next, all the asphalt mixes A to F were compacted at the mixing temperatures with simultaneous compaction resistance measurement. Table 2 shows the asphalt properties of each of the asphalt mixes A to F.

TABLE 2

| Asphalt properties | | | | |
|---|---|---|---|---|
| Mix No. | Compaction resistance T[1] [Nm] | Density [g/cm$^3$] | Indirect tensile strength ITS[2] [MPa] | Water sensitivity ITSR[3] [%] |
| Asphalt mixes: | | | | |
| A (Ref.) | 53.2 | 2.469 | 1.5 | 75 |
| E | 52.4 | 2.441 | 1.2 | 73 |
| F (Ref.) | 53.0 | 2.462 | 1.4 | 74 |

TABLE 2-continued

| Asphalt properties | | | | |
|---|---|---|---|---|
| Mix No. | Compaction resistance T[1] [Nm] | Density [g/cm$^3$] | Indirect tensile strength ITS[2] [MPa] | Water sensitivity ITSR[3] [%] |
| Foamed asphalt mixes: | | | | |
| B (Ref.) | 54.6 | 2.435 | 1.1 | 58 |
| C | 50.1 | 2.435 | 0.9 | 62 |
| D | 45.7 | 2.462 | 1.2 | 70 |

[1]According to TP Asphalt-StB part 10B
[2]According to TP Asphalt-StB part 23
[3]Indirect tensile strength ratio: after water storage/before water storage according to TP Asphalt-StB part 12

Unfoamed Asphalt Mixes:

The results demonstrate that the improved, significantly reduced, mixing temperature achieved as a result of the bitumen additive of the invention does not jeopardise compaction resistance: Compared to the hot mix reference (A), the addition of wax only at a 30° C. lower temperature (F) resulted in the same compaction resistance. Indeed, a slightly lower compaction resistance was obtained with the direct addition of the cationic bitumen additive to the asphalt mixer (E).

Table 2 shows that E and F have very similar properties. The advantage of E over F is in the dosage technique. Bitumen additive (E) can easily be added into a typical asphalt mixer at ambient temperature using a simple liquid dosage system. The direct addition of the wax (F) requires additional effort and more costly equipment: A dosage system for solid wax pastilles or a heated melting tank for molten wax storage including a heated liquid dosage system. Alternatively, the wax (F) can be pre-blended with the bitumen, which also requires an extra heated and stirred bitumen tank.

Foamed Asphalt Mixes:

The advantage of using the bitumen additive in foamed asphalt mixes can be seen to be in the properties of the final asphalt, rather than in the mixing temperature:

Bitumen foaming with water (B) resulted in higher compaction resistance, which was advantageously strongly reduced when bitumen additives were used for foaming (C, D). The lowest compaction resistance was found with bitumen foamed with the cationic wax emulsion (D).

While all foamed bitumen asphalts (B, C, D) had reduced density, tensile strength, and water sensitivity relative to the hot mix reference (A), the skilled person is often faced with scenarios where these are small trade-offs in light of the significantly reduced mixing temperatures. Again, the best performance for asphalt produced from bitumen foamed using the cationic bitumen additive (D).

Decreased Mixing Temperature

The inventors then prepared a new series of asphalt mixes to better evaluate the temperature reduction potential of the invention. All three mixes used the same aggregates and method of preparation. The only difference between them is the mixing temperatures. Other batches of aggregates were used, therefore these three new mixes are not for comparing with mixes A to F. Rather, they are intended for comparison with each other.

Mixes G, H and I were produced at different mixing temperatures using bitumen foamed with the cationic bitumen additive (used in asphalt mix (D), which gave the best performing mix as indicated above. The asphalt properties for each of mix G, H and I are shown in Table 3.

TABLE 3

Asphalt properties produced at various mixing temperatures using foamed bitumen with cationic bitumen additive

| Mix No. | Mixing temperature [° C.] | Compaction resistance T [Nm] | Density [g/cm$^3$] | Indirect tensile strength ITS [MPa] | Water sensitivity ITSR* [%] |
|---|---|---|---|---|---|
| G | 150 | 54.5 | 2.432 | 1.40 | 83.2 |
| H | 120 | 55.5 | not measured | 1.08 | 73.3 |
| I | 100 | 58.1 | 2.416 | 1.04 | 66.8 |

*Indirect tensile strength ratio: after water storage/before water storage

The results show a mixing temperature reduction of 30° C. from 150° C. (G) to 120° C. (H). This does not lead to significant increase in compaction resistance and thus demonstrates the beneficial effect of the bitumen additives of the invention on temperature reduction potential in asphalt mixing. The reduction in indirect tensile strength shown may well be a trade-off which a skilled person is prepared to take, in light of the reduced mixing temperature.

The results also indicate that the even more desirable temperature reduction from 120° C. to 100° C. does not impact the indirect tensile strength of the asphalt strongly. Again, there is a small trade-off, this time in terms of water sensitivity.

CONCLUSION

The results demonstrate that the bitumen additive can be successfully used for bitumen foaming. In comparison to bitumen foaming with pure water, bitumen foaming according to the method of the invention using the bitumen additive of the invention results in lower compaction resistance, better compaction, and better water sensitivity.

Second, the direct addition of the bitumen additive into the asphalt mixer according to the method of the invention results in comparable performance to dosing wax alone. Conveniently, the bitumen additive of the invention can be dosed into the asphalt mixer using existing liquid additive injection systems without the need to install an additional dosing system for the wax additives known in the prior art.

Conveniently the bitumen additive optionally comprising an elastomer enables asphalt co-modification, i.e. concurrent asphalt modification with both wax and elastomer, to improve the properties of the asphalt produced therefrom.

The invention claimed is:

1. A bitumen additive for warm mix asphalt comprising:

a wax dispersed in water, the water being in the continuous phase and the wax in the dispersed phase;

the wax comprising a Fischer-Tropsch wax and one or more hydrocarbon waxes; and a cationic emulsifier wherein the one or more hydrocarbon waxes is a petroleum slack wax;

wherein the wax comprises 20 wt % to 80 wt % of the petroleum slack wax; and 20 wt % to 80 wt % of the Fischer-Tropsch wax, each relative to a total mass of the mixture of the Fischer-Tropsch wax and the petroleum slack wax;

wherein the Fischer-Tropsch wax has the following properties:

a congealing point according to ASTM D938 of 50° C. or higher;

a MEK-oil content according to ASTM D7211-06 below 5 wt %;

a kinematic viscosity at 100° C. according to ASTM D7042-11 from 3 mm$^2$/s to 15 mm$^2$s;

a needle penetration at 25° C. according to ASTM D1321 below 30 1/10 mm; and a n-alkane content above 80 wt %;

wherein the petroleum slack wax has the following properties:

a congealing point according to ASTM D938 below 65° C.;

a MEK-oil content according to ASTM D7211-06 above 5 wt %;

a kinematic viscosity at 100° C. according to ASTM D7042-11 from 3.5 mm$^2$/s to 10 mm$^2$/s;

a needle penetration at 25° C. according to ASTM D1321 above 50 1/10 mm; and a n-alkane content below 70 wt %; and wherein the bitumen additive comprises from 30 wt % to 70 wt % of the wax, based on the total mass of the bitumen additive.

2. The bitumen additive according to claim 1, wherein the bitumen additive additionally comprises fatty alcohols.

3. The bitumen additive according to claim 1, wherein the bitumen additive comprises from 0.2 wt % to 10 wt % of the cationic emulsifier based on the total mass of the bitumen additive.

4. The bitumen additive according to claim 1, wherein the bitumen additive comprises an elastomer, wherein the bitumen additive comprises 1 wt % to 70 wt % of the elastomer based on the total mass of the bitumen additive.

5. The bitumen additive according to claim 1, wherein the Fischer-Tropsch wax has the following properties:

a congealing point according to ASTM D938 of 60° C. or higher;

a MEK-oil content according to ASTM D7211-06 below 2 wt %;

a kinematic viscosity at 100° C. according to ASTM D7042-11 from 5 mm$^2$/s to 10 mm$^2$/s;

a needle penetration at 25° C. according to ASTM D1321 below 10 1/10 mm; and a n-alkane content above 80 wt %.

6. The bitumen additive according to claim 1, wherein the petroleum slack wax has the following properties:

a congealing point according to ASTM D938 below 65° C.;

a MEK-oil content according to ASTM D7211-06 above 15 wt %;

a kinematic viscosity at 100° C. according to ASTM D7042-11 from 5 mm$^2$/s to 10 mm$^2$/s;

a needle penetration at 25° C. according to ASTM D1321 above 50 1/10 mm; and a n-alkane content below 40 wt %.

7. A method to produce a warm asphalt mix, the method comprising:

adding a bitumen feedstock and the bitumen additive according to claim 1 to an aggregate in an asphalt mixer thereby to produce the warm asphalt mix, wherein the bitumen feedstock a. is added to the aggregate prior to adding the bitumen additive to the aggregate; or b. is added to the aggregate concurrently with adding the bitumen additive to the aggregate.

8. The method according to claim 7, wherein the bitumen additive is added to the bitumen feedstock in an amount of from 0.1 wt % to 10 wt % based on the total mass of the bitumen feedstock.

9. The method according to claim 7, wherein the bitumen feedstock is foamed in the asphalt mixer when the bitumen feedstock is contacted with the bitumen additive.

10. The method according to claim 7, wherein the bitumen additive is added directly to the asphalt mixer using a liquid additive dosing system.

11. The method according to claim 7, wherein the bitumen additive is added to the bitumen feedstock in a bitumen foaming device thereby to form a foamed bitumen composition, and the foamed bitumen composition is then added to the aggregate in the asphalt mixer.

12. The method according to claim 7, wherein the aggregate comprises recycled or reclaimed asphalt pavement (RAP).

* * * * *